(12) United States Patent
Guo

(10) Patent No.: US 11,543,739 B2
(45) Date of Patent: Jan. 3, 2023

(54) OPTICAL SYSTEM OF SEMI-VERTICAL SINGLE LCD PROJECTOR

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 39 days.

(21) Appl. No.: 17/344,987

(22) Filed: Jun. 11, 2021

(65) Prior Publication Data

US 2021/0302811 A1 Sep. 30, 2021

(30) Foreign Application Priority Data

May 18, 2021 (CN) .......................... 202110544952.X

(51) Int. Cl.
| | | |
|---|---|---|
| *G03B 21/00* | (2006.01) | |
| *G03B 21/20* | (2006.01) | |
| *G03B 21/28* | (2006.01) | |
| *G03B 21/16* | (2006.01) | |

(52) U.S. Cl.
CPC .......... *G03B 21/006* (2013.01); *G03B 21/16* (2013.01); *G03B 21/2033* (2013.01); *G03B 21/2066* (2013.01); *G03B 21/28* (2013.01)

(58) Field of Classification Search
CPC .. G03B 21/006; G03B 21/16; G03B 21/2033; G03B 21/2066; G03B 21/28
See application file for complete search history.

(56) References Cited

U.S. PATENT DOCUMENTS

| | | | | |
|---|---|---|---|---|
| 11,366,376 | B2 * | 6/2022 | Guo ........................ | G03B 21/16 |
| 11,372,319 | B2 * | 6/2022 | Guo ...................... | G03B 21/006 |
| 11,385,510 | B1 * | 7/2022 | Guo ...................... | H04N 9/3105 |
| 2019/0361326 | A1 * | 11/2019 | Liu ........................ | G03B 21/145 |

FOREIGN PATENT DOCUMENTS

| | | | | | |
|---|---|---|---|---|---|
| EP | 1143744 | A2 * | 10/2001 | ......... | G02B 27/1026 |
| FR | 3070069 | A1 * | 2/2019 | ............. | G02B 13/16 |

\* cited by examiner

*Primary Examiner* — Tracie Y Green

(57) ABSTRACT

An optical system of a semi-vertical single LCD (liquid crystal display) projector includes a projection light source, a condenser, an illuminating reflector, a collimating lens, a heat reflecting glass, an LCD light valve, a field lens, an imaging reflector and a projection lens, all of which are set in sequence according to a direction of light, wherein the illuminating reflector reflects and turns light irradiating the LCD light valve in up and down directions, and the imaging reflector performs mirror reflection and turning on light emitted by the LCD light valve in left and right directions. The present invention obtains a new optical system structure, creates a novel stacking and a novel projector appearance, and has low cost, small size and complete integration.

9 Claims, 8 Drawing Sheets

OPTICAL SYSTEM OF SEMI-VERTICAL SINGLE LCD PROJECTOR

CROSS REFERENCE OF RELATED APPLICATION

The present invention claims priority under 35 U.S.C. 119(a-d) to CN 202110544952.X, filed May 18, 2021.

BACKGROUND OF THE PRESENT INVENTION

Field of Invention

The present invention relates to the field of projectors, and more particularly to an optical system of a semi-vertical single LCD (liquid crystal display) projector.

Description of Related Arts

According to the known and common knowledge, the structure of the optical system, especially the setting of reflectors, basically determines the overall approximate size and shape of the single LCD projector. At present, there are three types of optical systems of the single LCD projector, namely, the direct projection type optical system, one-piece reflector type optical system and two-piece reflector type optical system.

The direct projection type optical system, as the name implies, means that there is no turning between the projection light source and the projection lens, in which the entire optical system is cylindrical and the optical axis of each optical device of the optical system is on the same straight line, it is also possible that the optical axis of a certain optical device and the optical axes of other optical devices are not on the same straight line, but are parallel to each other. The one-piece reflector type optical system means that between the projection light source and the LCD light valve, or between the LCD light valve and the projection lens, a reflector is set to turn the forward direction of the light path of the optical system. The two-piece reflector type optical system means that between the projection light source and the LCD light valve, and between the LCD light valve and the projection lens, two reflectors are set to turn the forward direction of the light path of the optical system, respectively. So far, the reflectors used for single LCD projectors on the market are all plane reflectors which are prepared by plating a layer of dielectric film or metal film on the surface of flat glasses. In addition to changing the direction of the optical axis, the plane reflectors are unable to theoretically change other optical parameters. Therefore, if the plane of the reflector is able to be changed into a curved surface with compression convergence or expansion divergence function, in the process of light transmission, the selectivity of matched dimensionality and corrections of optical extension (Etendue) and Laplace invariant (proposed by Joseph-Louis Lagrange and Hermann von Helmholtz) of optical system is increased, the optical system of projector will surely get more design freedom and higher optical performance indicators.

Single LCD projectors have large light valves (which are generally 3-8 inches). Generally, when the size of the light valve is ≥3.5 inches, the direct projection type projector will be quite large and the ratio of length to width thereof is out of coordination, so it is no longer suitable for the market. When the single LCD projector was born in the late 1980s, the first product was a direct projection type projector, referring to the products of Sharp Company at the time. Because its direct competitor is the CRT (Cathode Ray Tube) projector, even though the volume of the direct-projection single LCD projector at that time is "extremely amazing", such as 0.5 m (meter)×0.35 m×0.15 m=26 L (liter), but compared with the volume of ordinary CRT projectors at that time, such as 0.7 m×0.6 m×0.3 m=126 L, the volume of a direct-projection single LCD projector is extremely superior. Relatively speaking, the coordination of appearance is not so important.

Soon, people used a reflector to reduce the volume of a single LCD projector, improve the utilization of the internal space of the projector, and obtain a more coordinated appearance. One-piece reflector-type single LCD projector means that a reflector is set between the LCD light valve and the projection lens, which has been popular and continues to be used in today's domestic single LCD projectors since the Sharp projector in the early 1990s, referring to FIGS. 11, 13 and 14 (P' in FIG. 11 represents the projection lens). The width w' (which is equivalent to the width of the projector) of the front panel of the projector housing is significantly larger than the height h' (which is equivalent to the height of the projector) of the front panel of the projector housing. In general, w'/h' is more than 2 times, the shape of the whole machine is in a horizontal state, so the projector is habitually called the horizontal projector.

This kind of technology and market deposition for decades has the advantages of mature technology, extensive supporting facilities, and high cost performance. However, the shortcomings are also reflected in that the probability of appearance innovation is extremely low which is brought by high maturity, the appearance is almost unchanged, it is difficult to design a bright appearance, the product homogeneity is serious, it is difficult to find and combine with fashion, beauty and unique personality pursued by consumer digital products in the new era, the utilization of internal space is not high at the same time (in which internal spaces are surrounded by a triangle by the optical system and the projector housing, resulting in unreasonable use. For the optical system under the same indicators, the corresponding projector is relatively larger in volume.

Therefore, people invented two-reflector type projector, such as U.S. Pat. No. 10,509,306 B1. In this invention, only the optical system of projector and some parts of accessories (such as driver board and heat dissipation system of LCD light valve) are integrated, the switching mode power supply and the high-power sound box are not integrated, so that the internal space utilization of projector is very high, which makes the projector is relatively small in volume, and has significant advantages such as novel shape, freshness and impact to consumers. For example, products disclosed by CN 305671219 S and CN 305655533 S based on U.S. Pat. No. 10,509,306 B1 are very popular with consumers. As claimed by claim 1 in U.S. Pat. No. 10,509,306 B1 that "and the first reflector (7) conducts mirror reflection along a long axis thereof", it is able to known that when the light emitted by the LCD light valve is projected on the screen through the projection lens, the reflector (7) makes the image on the screen mirror up and down, in which "a long axis" represents a long axis of the LCD light valve, referring to x' in FIG. 3.

The above-mentioned U.S. Pat. No. 10,509,306 B1 brings the innovative projector appearance as shown in FIGS. 12 and 15 (P'' in FIG. 12 is the projection lens). The width w'' (which is equivalent to the width of the projector) of the front panel of the projector housing is significantly larger than the height h'' (which is equivalent to the height of projector). Generally, h"/w" is more than 1.18 times, and more products are even as high as 2-2.5 times or more. The appearance of the entire machine is in a standing state, so people also call it to be a vertical-type projector. This new form of optical system is not yet mature in internal stacking, especially the output brightness, heat dissipation performance, built-in switching power supply and built-in high-power sound box all have a very sharp contradiction with a reasonable increase in size, that is, when the integrated integrity and brightness output of the one-reflector type projector shown in FIG. 13 are achieved, the product shown in FIG. 12 does not only have the advantage of volume, but also there are problems with the novelty, uniqueness and coordination of appearance.

Therefore, how to better meet the market demands for projectors, such as fashion appearance, small size, mature supporting facilities, low cost, high integration and convenient use, has become an urgent problem to be solved by those skilled in the art.

SUMMARY OF THE PRESENT INVENTION

An object of the present invention is to overcome the shortcomings of the prior art and provide an optical system of a semi-vertical single LCD (liquid crystal display) projector, which not only realizes more selectivity of matched dimensionality and corrections of optical extension and Laplace invariant in the process of light transmission, but also significantly improves the performance of the optical system, and at the same time obtains a new optical system structure, creating a new stacking and a novel projector appearance, low cost, small size, and complete integration.

Accordingly, in order to achieve the above-mentioned object, the present invention provides an optical system of a semi-vertical single LCD (liquid crystal display) projector, which comprises a projection light source, a condenser, an illuminating reflector, a collimating lens, an LCD light valve, a field lens, an imaging reflector and a projection lens, all of which are set in sequence according to a direction of light, wherein the illuminating reflector reflects and turns light irradiating the LCD light valve in up and down directions, and the imaging reflector performs mirror reflection and turning on light emitted by the LCD light valve in left and right directions.

Preferably, the illuminating reflector is a plane reflector which is prepared by plating a layer of reflective film on a flat glass.

Preferably, the imaging reflector is a plane reflector which is prepared by plating a layer of reflective film on a flat glass.

Preferably, the illuminating reflector is a mirror aluminum sheet, distribution parameters of a light radiation angle of the condenser match optical properties of a reflective surface of the illuminating reflector.

Preferably, the reflective surface of the illuminating reflector is cylindrical, spherical, aspherical, mechanically planar or free-form cambered.

Preferably, the reflective surface of the illuminating reflector is a cylindrical surface in up and down directions, a central axis of the cylindrical surface in up and down directions is parallel to a long side of the LCD light valve, a direction of an optical compression characteristic of the illuminating reflector is parallel to the central axis of the cylindrical surface in up and down directions.

Preferably, the reflective surface of the illuminating reflector is a cylindrical surface in left and right directions, a central axis of the cylindrical surface in left and right directions is orthogonal to the long side of the LCD light valve, the direction of the optical compression characteristic of the illuminating reflector is parallel to the central axis of the cylindrical surface in left and right directions.

Preferably, the imaging reflector is a mirror aluminum sheet, parameters of the field lens and the projection lens match optical properties of a reflective surface of the imaging reflector.

Preferably, the reflective surface of the imaging reflector is cylindrical, spherical, aspherical, mechanically planar or free-form cambered, a polarization of the reflective surface of the imaging reflector is consistent with a polarization of the light emitted by the LCD light valve.

Preferably, the condenser is a single lens, a combination of multiple lenses, or a combination of a reflective cup and a lens.

Beneficial effects of the present invention are as follows.

(1) Through the reflection combination of illuminating reflector and imaging reflector in different directions, the present invention obtains a new optical system structure, creates a new stacking and a novel projector appearance, significantly reduces the overall volume of the existing projector in stacking mode, significantly increases the utilization rate of the internal space of the projector, which has a very obvious innovative effect on further rationalization of increasing the heat dissipation and the effect of sound box.

(2) The present invention replaces a traditional plane reflector with a mechanically planar mirror aluminum sheet whose reflective surface has expansion and compression functions. By designing the condenser to match the illuminating reflector, higher illumination efficiency is able to be obtained to a certain extent; even though the traditional aluminum film plane reflector is replaced, a large improvement in illumination efficiency is also obtained.

(3) In the present invention, the reflective surface of illuminating reflector and imaging reflector is designed to be curved, which is equivalent to inserting one or more optical lenses into the optical system, so that more design and correction methods are provided for the optical extension and Laplace invariant of the optical system in the transmission process, so as to greatly improve the performance of optical system without increasing the product cost. At the same time, when the imaging mirror is embodied to the mirror aluminum sheet, the polarization of imaging reflector is reasonably utilized for further improving the extinction ratio of the LCD light valve in the polarization detection, so as to improve the contrast of projection image of a product.

BRIEF DESCRIPTION OF THE DRAWINGS

In order to more clearly illustrate technical solutions of the present invention or prior arts, the drawings used in the embodiments of the present invention or prior arts will be briefly described as below. Obviously, the drawings described below show only some embodiments of the present invention. For those skilled in the art, other relevant drawings are also able to be obtained according to these drawings without any creative work.

DETAILED DESCRIPTION OF THE PREFERRED EMBODIMENT

Figure 1:
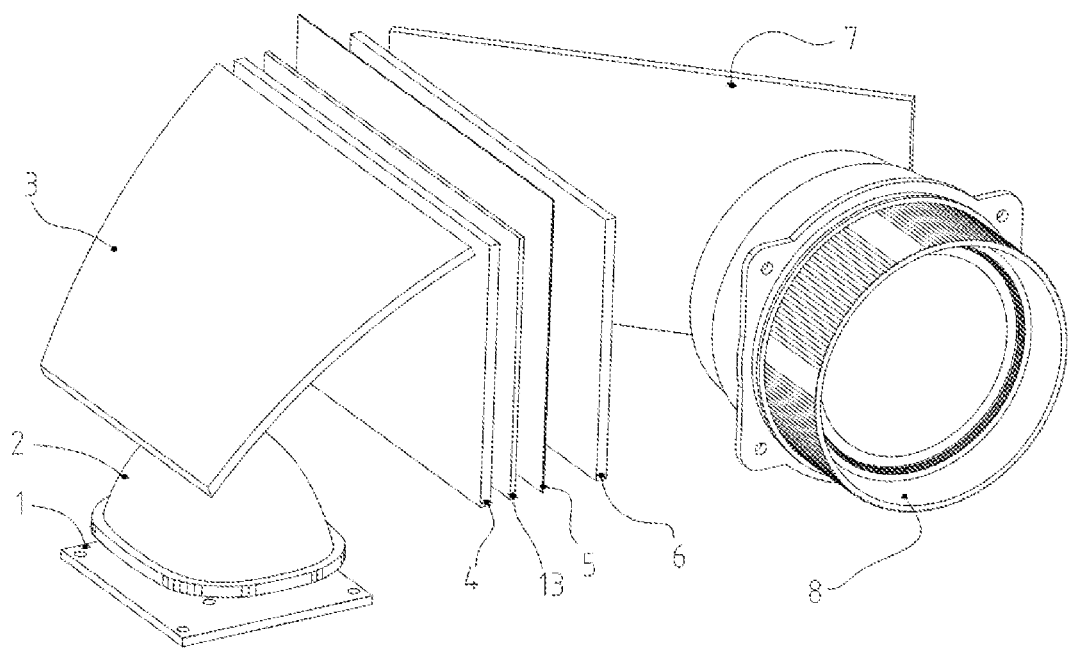
FIG. 1 is a three-dimensional view of an optical system of a semi-vertical single LCD (liquid crystal display) projector provided by the present invention.

In order to make those skilled in the art better understand the present invention, the present invention is further described in detail in combination with the accompanying drawings as follows. It should be understood that the specific embodiments described herein are merely illustrative of the present invention and are not intended to limit the present invention.

It should be known that similar labels and letters represent similar items in the accompanying drawings. Therefore, once a certain item is defined in a drawing, there is no need for the item to be further defined and explained in the subsequent drawings.

It should be noted that the orientation or position relationship indicated by the terms "center", "upper", "lower", "left", "right", "vertical", "horizontal", "inner" and "outer" is based on the orientation or position relationship shown in the accompanying drawings, or on the orientation or position relationship commonly used in the use of the product provided by the present invention. The terms are simply intended to facilitate the description and simplification of the present invention, rather than to indicate or imply that the device or element specified must have a specific orientation, be constructed and operated in a specific orientation, and therefore are unable to be understood as a limitation to the present invention. In addition, the terms "first", "second and "third" are used only for distinguishing and are unable to be understood as indicating or implying relative importance.

In addition, "horizontal", "vertical", "overhanging" and other terms do not mean that the component is required to be absolutely horizontal or overhanging, but may be slightly inclined. For example, "horizontal" only means that its direction is more horizontal than "vertical", it does not mean that the structure must be completely horizontal, but is able to be slightly inclined.

In the description of the present invention, it should also be noted that unless otherwise clearly defined, the terms "setting", "installation", "connection" and "communication" should be understood in a broad sense. For example, the term "connection" is able to be "fixed connection", "detachable connection", or "integrally connection"; also, is able to be "mechanical connection" or "electrical connection"; is able to be "direct connection", "indirectly connection through intermediate media" or "connection within two components". For those skilled in the art, the specific meaning of the above terms in the present invention is able to be understood according to the specific condition.

First Embodiment

Referring to FIGS. 1 and 3-6 of the drawings, an optical system of a semi-vertical single LCD (liquid crystal display) projector according to a first preferred embodiment of the present invention is illustrated, wherein the optical system comprises a projection light source 1, a condenser 2, an illuminating reflector 3, a collimating lens 4, a heat reflecting glass 13, an LCD light valve 5, a field lens 6, an imaging reflector 7 and a projection lens 8, all of which are set in sequence according to a direction of light.

The projection light source 1 is a high-power array LED (light emitting diode) light source, such as COB (chip on board) light source.

The condenser 2 is a single lens having a flat-convex structure, which comprises a convex surface and a flat surface, wherein the convex surface is a free-form curved surface, and the flat surface faces towards the projection light source 1.

The projection industry has benefited from the technological innovation more than 10 years ago. For example, it is disclosed by Chinese Patent Publication No. CN 201622432 U, that a heat reflecting glass 13, prepared by attaching a DBEF (dual brightness enhancement film from 3M company in the United States) to a whiteboard glass, is provided between a collimating lens 4 and an LCD light valve 5; generally, the heat reflecting glass 13 is about 2-3 mm away from an exit surface of the collimating lens 4, so as to significantly reduce a temperature of the LCD light valve 5, which has become a common practice in the current industry.

Figure 3:
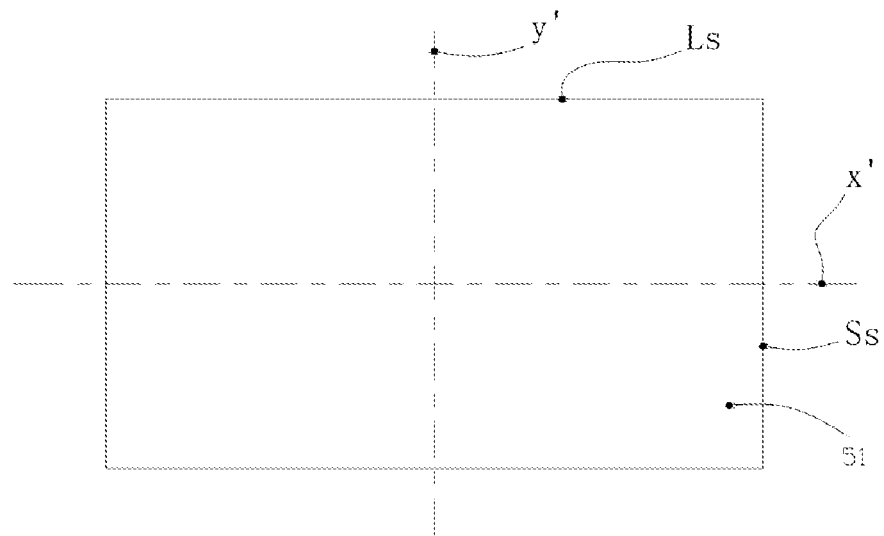
FIG. 3 shows a display window of an LCD light valve of the optical system.

As shown FIG. 3, Ls represents a long side of an active area (AA) 51 of the LCD light valve 5, Ss represents a short side of the active area 51, x' represents a bisector of Ss and is known as a horizontal bisector of the active area 51, y' represents a bisector of Ls and is known as a vertical bisector of the active area 51.

The illuminating reflector 3 reflects and turns light which illuminates the LCD light valve 5 in up and down directions, i.e., after the illuminating reflector 3 is set, along the horizontal bisector x' in FIG. 3 of the active area 51 of the LCD light valve 5, the light which illuminates an upper area (above x' in FIG. 3) of the LCD light valve 5 is mirrored to a lower area (below x' in FIG. 3) of the LCD light valve 5. Similarly, the light which illuminates the lower area (below x' in FIG. 3) of the LCD light valve 5 is mirrored to the upper area (above x' in FIG. 3) of the LCD light valve 5. At the same time, the imaging reflector 7 reflects and turns light emitted by the LCD light valve 5 in left and right directions, i.e., due to the imaging reflector 7, along the vertical bisector y' in FIG. 3 of the active area 51 of the LCD light valve 5, the light emitted by the LCD light valve 5 is mirrored in left and right directions while reaching the projection lens 8.

Through the reflection combination of illuminating reflector 3 and imaging reflector 7 in different directions, the present invention obtains a new optical system structure, creates a new stacking and a novel projector appearance, significantly reduces the overall volume of the existing projector in stacking mode, significantly increases the utilization rate of the internal space of the projector, which has a very obvious innovative effect on further rationalization of increasing the heat dissipation and the effect of sound box.

The illuminating reflector 3 is preferably embodied as a mirror aluminum sheet, and is especially the mirror aluminum sheet from Alanod aluminum Company, Germany, which has a total reflectivity ≥95%, such as Model 4270GP and M95AX4. This kind of material is very common in the market. In addition to Germany, there are a large number of companies are supplying this material in Italy, the United States, China, Japan and South Korea.

Figure 6:
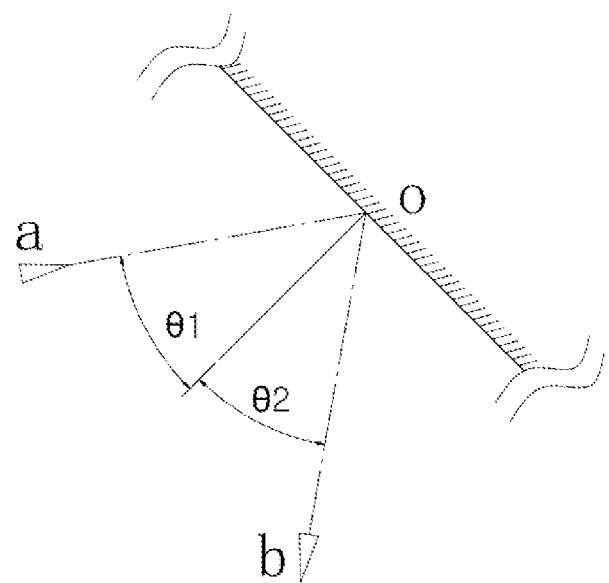
FIG. 6 shows a plane reflector of the optical system.

Referring to FIG. 6, if a plane reflector is set in an optical path, an incident light ao, a reflection light ob, an incident angle θ1 and a reflection angle θ2 will strictly abide by Reflection Law in physics, i.e., the reflector only turns the advanced direction of light, and does not change an angle between the light and the optical axis. Because of the special surface structure of the mirror aluminum sheet, taking the Alanod aluminum 4270GP, Germany as an example, it looks like a plane reflector, but in fact, even if there is no any mechanism deformation, the Alanod aluminum 4270GP is not a strict plane reflector. For Alanod aluminum 4270GP, there are two orthogonal directions on the reflective surface, the material has characteristics of a concave reflector for converging and compressing light in one of the two orthogonal directions, and characteristics of a convex reflector for expanding and diverging light in another of the two orthogonal directions; an equivalent radius of curvature of a concave surface or a convex surface is related to an angle of the incident light, and has little to do with a wavelength of visible light. At the micro level, an intersection point O of the light ao and ob in FIG. 6 still obeys the Reflection Law, but at the macro level, compared to a mechanical appearance of the illuminating reflector 3 which is embodied as a mirror aluminum sheet, not only the advanced direction of light is turned, the angle between the light and the optical axis is changed, thereby achieving convergence, compression, expansion, and divergence. Therefore, when the illuminating reflector 3 is embodied as a mirror aluminum sheet, the above characteristics of the mirror aluminum sheet bring more freedom for the design of condenser 2, and parameter optimization and selection of lighting system of projector. Compared with the traditional plane reflector, even if there is no mechanical deformation, the illuminating reflector 3 is also able to help the above design, which is equivalent to adding a lens in the light system of projector in x' and y' directions of the LCD light valve 5. The lens has different characteristics in two directions.

Figure 4:
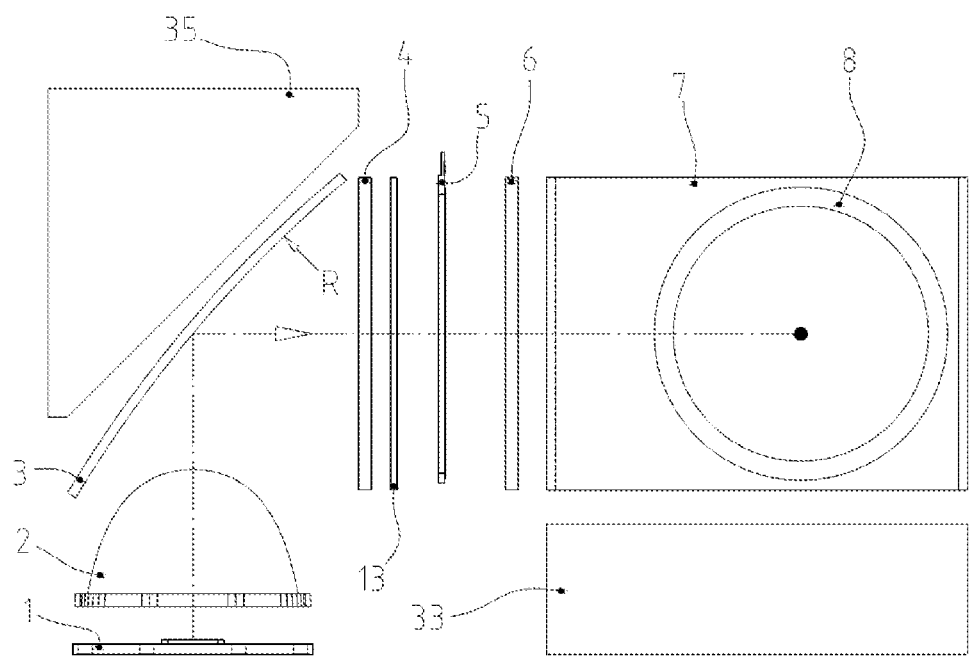
FIG. 4 is a structurally schematic view of the optical system of the semi-vertical single LCD projector provided by the present invention.
Figure 5:
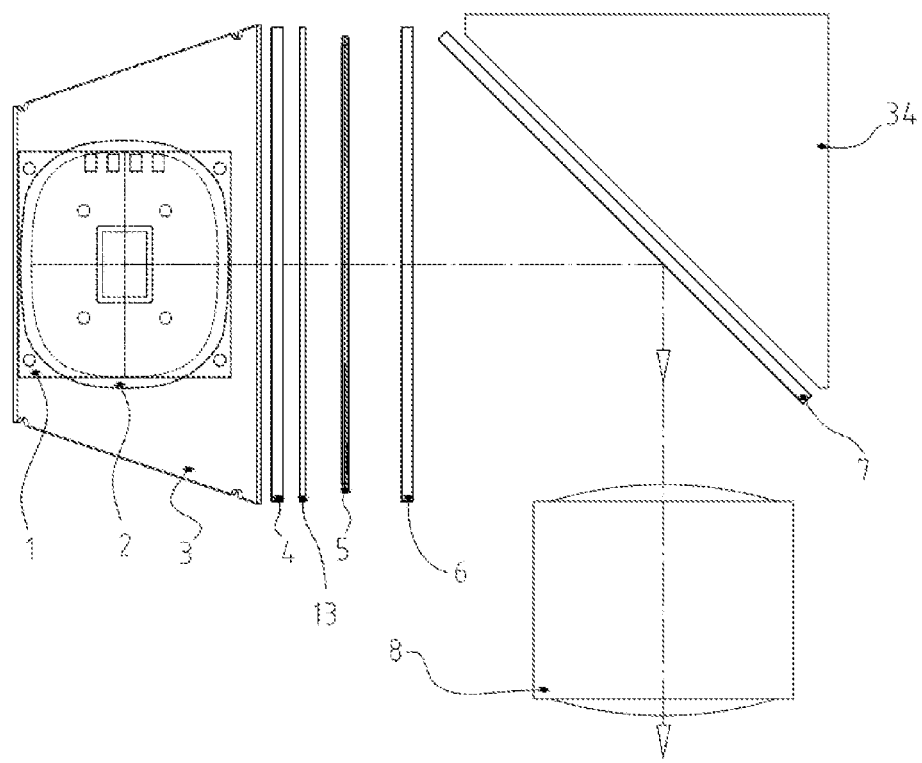
FIG. 5 is a top view of FIG. 4.

Referring to FIG. 1 and FIG. 4, according to the first embodiment of the present invention, the illuminating reflector 3 is embodied as a mirror aluminum sheet which has a concave cylindrical surface in upper and lower directions, a central axis of the concave cylindrical surface in upper and lower directions is parallel to the long side of the LCD light valve 5. At the same time, a direction of an optical compression characteristic of the illuminating reflector is parallel to the central axis of the concave cylindrical surface in up and down directions.

When the illuminating reflector 3 is embodied as a mirror aluminum sheet, whether the illuminating reflector 3 is cylindrical, spherical, aspherical or free-form curved, according to different structures of the condenser 2, under the condition that the F # of the projection lens 8 is unchanged, the lighting system of projector achieves an efficiency increase of 4-20% or more compared with the above-mentioned mirror aluminum plate without mechanical deformation. At the same time, it is easier to improve the uniformity, vignetting, color coordinate shift and other indicators of the lighting system. The fewer the number of optical devices (such as lenses) used in the condenser 2, the more obvious the improvement in illuminating efficiency, the simpler the structure and the lower the cost.

Compared with the glass aluminized film plane reflector commonly used in the industry at this stage (whose reflectivity is generally about 82-86%), even if the mirror aluminum sheet without mechanical deformation is used to replace in the present invention, that is, there is no matching design with the condenser 2, the simple reflection efficiency is also improved by a lot (up to 9-13%). At the same time, when the above-mentioned mirror aluminum sheet, having the light compression or expansion function, matches the condenser 2, the illumination efficiency of the projector is further improved.

Second Embodiment

Figure 2:
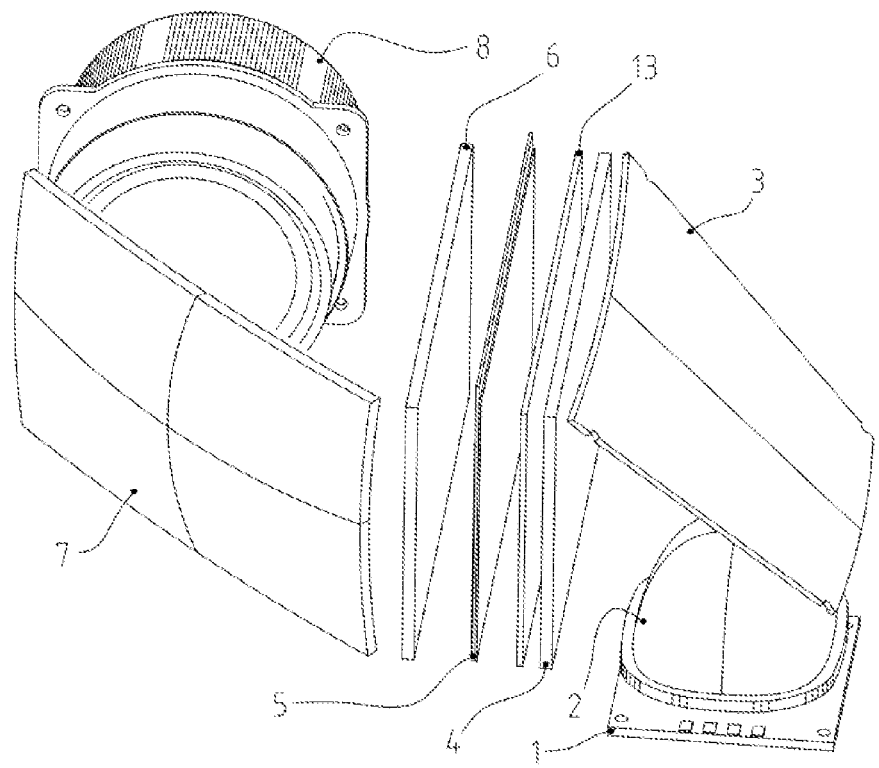
FIG. 2 is another three-dimensional view of the optical system of the semi-vertical single LCD (liquid crystal display) projector provided by the present invention.

Referring to the first embodiment and FIG. 2, the illuminating reflector 3 is embodied as the mirror aluminum sheet, the reflective surface of the illuminating reflector 3 is the concave cylindrical surface in left and right directions, the central axis of the concave cylindrical surface in left and right directions is orthogonal to the long side of the LCD light valve 5. The direction of the optical compression characteristic of the illuminating reflector 3 is parallel to the central axis of the concave cylindrical surface in left and right directions.

The imaging reflector 7 is preferably embodied as the mirror aluminum sheet made from the foregoing 4270GP material, the reflective surface of the imaging reflector 7 is a simple aspheric surface, and a polarization thereof is consistent with an analyzing angle of the LCD light valve 5.

In the single LCD projector, the LCD light valve 5 is large in size, so a manufacturing difficulty of the projection lens 8 is increased, resulting in that the imaging quality of the projection lens 8 is generally low. The lens diameter of single LCD projector is relatively large, due to the limitation of cost and process, in the history of single LCD projector, there is no use of aspheric lens, freeform curved lens and other lenses to prepare high quality projection lens 8.

In the imaging light path from the field lens 6 to the projection lens 8, the size of imaging mirror 7 is the largest and the structure is simplest, and accordingly, the absolute sensitivity to the production accuracy is also the lowest. Therefore, for expecting high-quality images from the projector, the probability and possibility of successful implementation on preparing the imaging mirror 7, which is embodied as the mirror aluminum sheet and has cylindrical, spherical, aspherical or free-form curved surface, is relatively higher than preparing the high-quality field lens 6 and projection lens 8 with the aspheric lens and free-form curved lens.

Among the several parameters of a single LCD projection image (which are also able to be considered as the optical parameters of the projection lens 8), "curvature of field" is one of the most difficult to control and obtain parameters (because of the large light valve size, and relatively large field of view), and the is the parameter that users are able to most directly perceive. Generally speaking, 99% of the curvature of field of cheap lenses used in the single LCD projection industry are unable to satisfy users. Moreover, it is also difficult for users to bear the cost of improving the curvature of field of lens. However, once the imaging reflector 7 has a simple cylindrical surface, an immediate effect for improving the curvature of field is brought. For the current LCD light valves 5, the active areas 51 are almost all designed with a width to length ratio of 16:9, so the improvement of curvature of field is easily obtained by optimizing the projection lens 8 in the ½ field of view, and the Cooke Ttipet lens popular in the industry is unlikely to achieve good results outside the ½ field of view. When the imaging reflector 7 has a horizontal cylindrical surface (whose central axis is parallel to y' in FIG. 3), because the LCD light valve 5 only has a horizontal image outside of the ½ field of view, once a cylindrical lens is added, it is easy to significantly improve the curvature of field and create a better experience for users.

When it is desired to prepare the projection lens 8 with a large aperture to obtain a sufficiently high brightness output, all indicators of the projector except the brightness will be sacrificed and deteriorated within a certain cost limit. At this time, the most likely way to achieve a large aperture and still have a higher image quality level and maintain a high cost performance is the only option to design and manufacture the imaging reflector 7 as an aspherical reflector and a free-form curved reflector.

The above embodiment focuses on the optical innovation of the present invention. That is to say, for the illuminating reflector 3, whether it has a mechanical surface or other reflective surfaces, it is able to bring higher illuminating efficiency and other positive optical index contributions to the prior art. The imaging reflector 7 is set with different curved surfaces, so that the quality of output images of projector is improved, which is an effective method that is able to bring practical results in addition to the barriers of cost, technology and process limitations.

Third Embodiment

In the following, a more objective and specific application is taken as an example to illustrate the advantages of the present invention in the aspects of the overall machine volume, shape coordination, shape innovation, and stacking integration integrity.

The raw materials for each component of the optical system are shown in the following table, as shown in FIGS. 1 to 10.

| Serial Number | Component | Characteristics of components | Positions |
|---|---|---|---|
| 1 | Projection light source 1 | The projection light source is an LED light source with a power of 80 W, an illuminating area of 60 mm² and includes a substrate with a thickness of 2.3 mm | |
| 2 | Condenser 2 | The condenser is a plano-convex freeform curved lens with a central thickness of 21.5 mm, whose equation is omitted here. | An incident surface of the condenser is flat and is 5.2 mm away from the illuminating surface. |
| 3 | Illuminating reflector 3 | The illuminating reflector is made from 95% Alanod aluninum, Germany, which has a thickness of 1.5 mm, a cylindrical surface, an isosceles trapezoid illuminating surface with an upper side of 58 mm, a bottom side of 83.6 mm and a height of 58.2 mm. | As shown in FIG. 6, an intersection point of an optical axis of projector and the illuminating reflector is 48.83 mm away from the illuminating surface. |
| 4 | Collimating lens 4 | The collimating lens is a Fresnel lens with a length × width × thickness of 89 mm × 49 mm × 2 mm, and a standard focal length of 90 mm. | An incident surface of the collimating lens is flat and is 71 mm away from the illuminating surface. |
| 5 | LCD light valve 5 | The LCD light valve is embodied as a 3.5-inch full HD LCD screen, BOE Company, which has a glass appearance of 81 mm × 51.9 mm × 1 mm and an active area of 77.76 mm × 43.74 mm. | TFT (thin film transistor) is 83 mm away from the illuminating surface. |
| 6 | Field lens 6 | The field lens is a Fresnel lens with a length × width × thickness of 89 mm × 49 mm × 2 mm, and a standard focal length of 110 mm. | An incident surface of the field lens is tooth-shaped and is 93 mm away from the illuminating surface. |
| 7 | Imaging reflector 7 | The imaging reflector is made from 95% Alanod aluninum, Germany, which has a thickness of 2 mm, an aspherical surface, an illuminating surface with a length × width of 91.4 mm × 49 mm. | As shown in FIG. 6, an intersection point of an optical axis of the projector and a reflector is 141.35 mm away from the illuminating surface. |
| 8 | Projection lens 8 | The projection lens has an F# of 2.8, a focal length of 110 mm, a diameter of 55.4 mm, a lens mechanical length of 45.34 mm, and a total lens length of 135.26 mm | A top point of the incident surface is 172.04 mm away from the illuminating surface. |

| Serial Number | Component | Characteristics of components | Positions |
|---|---|---|---|
| 9 | Radiator 9 | The radiator is a straight rib profile, has a right-angled trapezoid ventilation cross section, a length × width × equivalent height of 80 mm × 70 mm × 18 mm (with a side of 21 mm and another side of 15 mm, has 33 fins, and an equivalent surface area of 950 $cm^2$. | The radiator is attached to the back of the projection light source. |
| 10 | Fan 10 | The fan is a turbine fan with a model of 8025, which has a length × width × height of 80 mm × 80 mm × 25 mm and DC of 12 V/250 mA | |
| 11 | Heat reflecting glass 13 | The heat reflecting glass has a length × width × thickness of 89 × 49 × 0.7. | An incident surface of the heat reflecting glass is attached to DBEF and is 75.5 mm away from the illuminating surface. |
| 12 | Driver board 32 | The driver board is embodied as an M-star V53 chip, which has a length × width of 81.2 mm × 68.7 mm, a total height of 10 mm and includes HDMI, USB and other inputs. | The driver board is to drive the LCD light valve for display, and is installed in an upper regular chamber of the projection lens 8 and the imaging reflector 7. |
| 13 | Switching power supply 33 | The switching power supply has a power of 100 W, in which 80 W of power is for the projection light source 1, 20 W of power is for the driver board, has a length × width of 118 mm × 57 mm, a total height of 40 mm. | The switching power supply is installed in a lower regular chamber of the projection lens 8 and imaging reflector 7. |
| 14 | Right sound box 34 | The right sound box has a resistor of 4 Ω, a power of 5 W, and a volume of about 0.173 L. | The right sound box is installed within a side chamber which is corresponding to an external surface of the imaging reflector 7. |
| 15 | Left sound box 35 | The left sound box has a resistor of 4 Ω, a power of 5 W, and a volume of about 0.092 L. | The left sound box is installed within an upper chamber which is corresponding to the illuminating reflector 3. |

Figure 9:
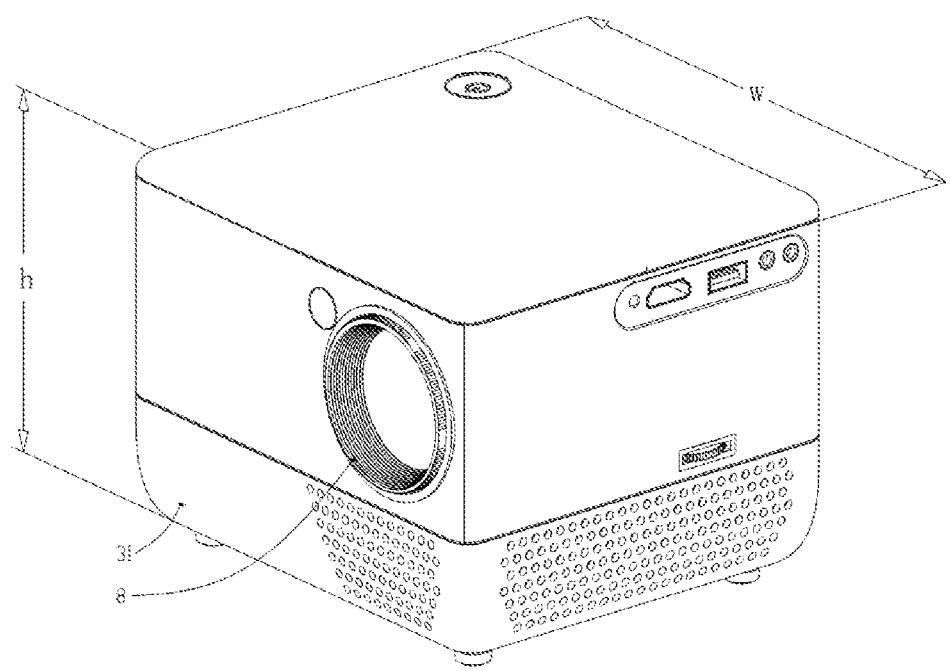
FIG. 9 shows an appearance of the projector.
Figure 13:
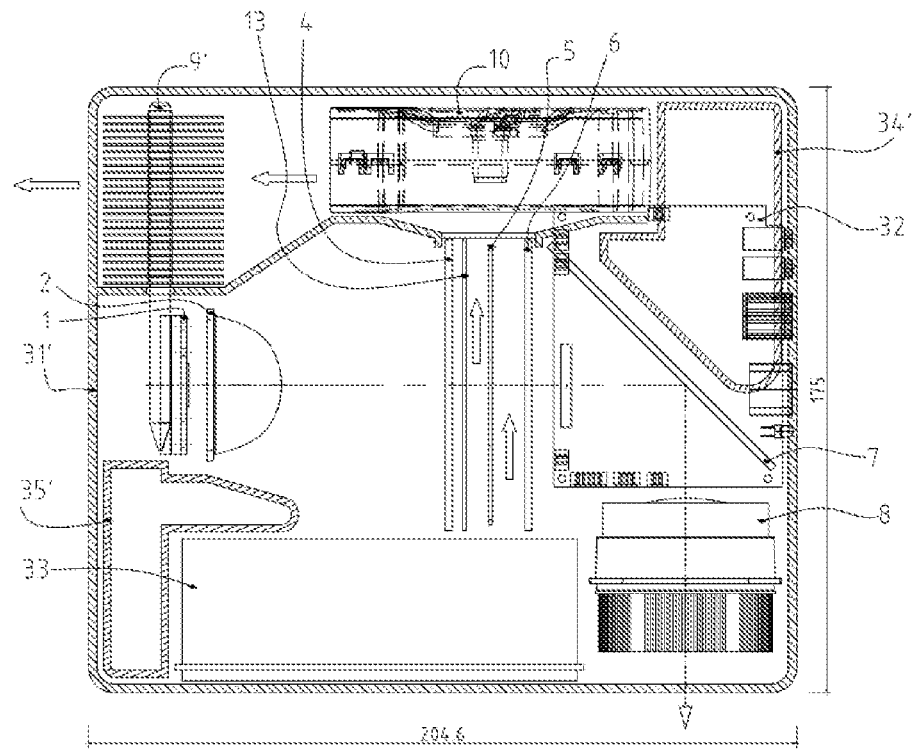
FIG. 13 is a sectional view of the horizontal projector in the prior art.
Figure 14:
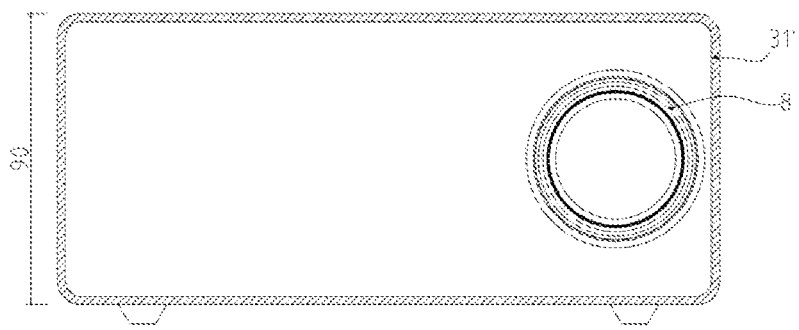
FIG. 14 is a bottom view of FIG. 13.

FIGS. 13 and 14 show a conventional horizontal projector whose parameters refer to the table above (no illuminating reflector 3 is included in the optical system), which has a length×width×height of 205×175×90 mm and a volume of about 3.2 L. In FIGS. 13 and 14, 9' is a radiator of projection light source 1, 31' is a projection housing, 34' is a right sound box with a height of 70 mm and a volume of 0.17 L, a drive board 32 is installed on an upper portion of the right sound box, 35' is a left sound box with a height of 80 mm and a volume of 0.098 L, a total volume of the right sound box and the left sound box is about 0.27 L. Compared with the products of the single LCD projection industry and the indoor space of the user's actual use environment at this stage, the above mentioned sound boxes have a sound effect recognized by users.

FIG. 14 is a bottom view of FIG. 13. The projector shown in FIG. 14 has relatively larger size and better heat dissipation effect, and no illuminating reflector 3 is included. Normally, a better-made product is able to output a brightness of about 200 Lm (ANSI).

Figure 12:
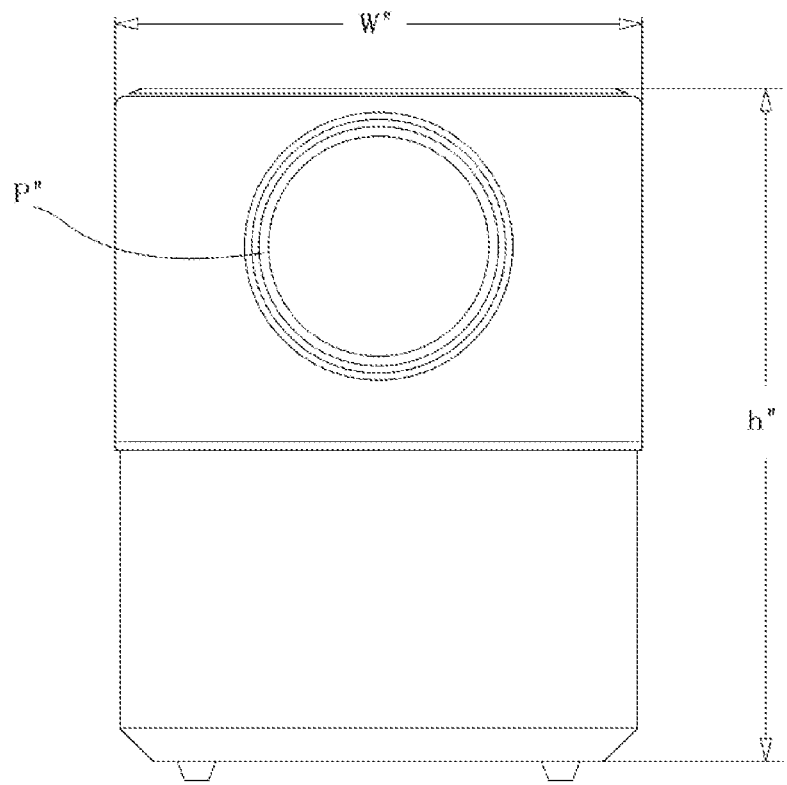
FIG. 12 shows an appearance of a vertical projector in the prior art.
Figure 15:
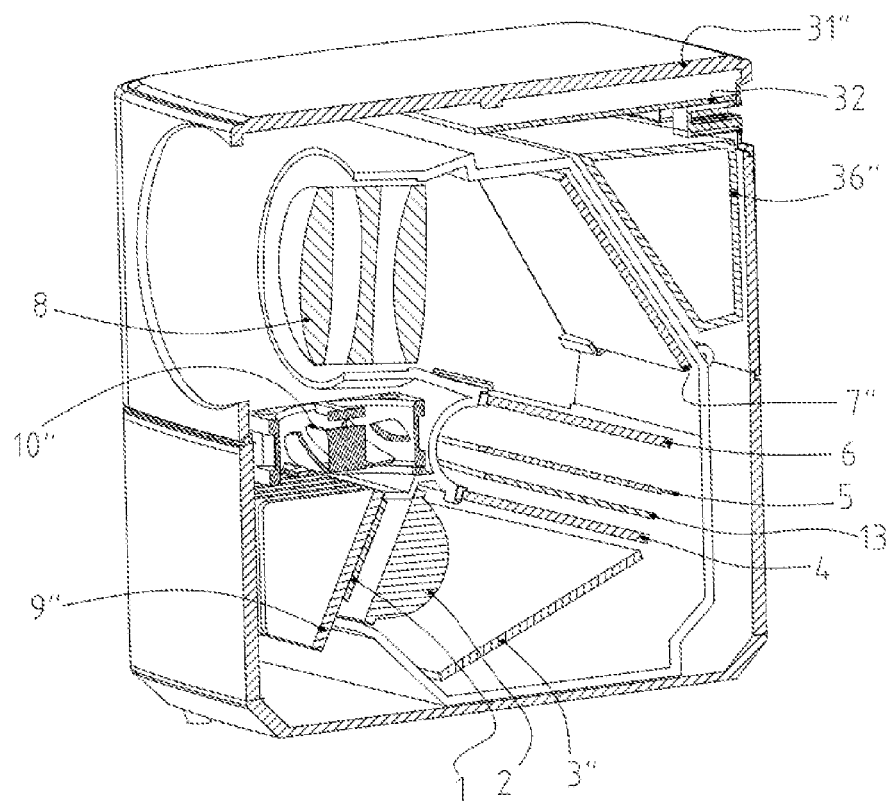
FIG. 15 is a three-dimensional sectional view of the vertical projector in the prior art.

FIGS. 12 and 15 show a product disclosed by U.S. Pat. No. 10,509,306 B1, which is a vertical projector. It is an excellent product representative with the smallest volume, has a good sales performance on e-commerce platforms such as JD, Taobao and Amazon, and has very beautiful appearance. In FIGS. 12 and 15, 3" is an illuminating reflector, 7" is an imaging reflector, 31" is a projection housing with a height×width×depth of 142 mm×120 mm×138, a volume of 2.4 L; due to the size of projector, a sound box 36" has a volume of about 0.05 L, a switching power supply 33 is unable to be built-in and needs to be connected with an external power adapter. Simultaneously, the overall projector is small, a radiator 9" of projection light source 1 is limited in heat expansion capacity, a fan 10 with a large size, such as Model 8025, is unable to be installed, so a fan 10" with a small size is adopted. Accordingly, a power of the projection light source 1 is allowed to be about 40 W. The product made with the 3.5-inch LCD light valve 5 produced by BOE (Beijing Oriental Electronics, China) in the above table is only able to output about 70-80 Lm of brightness. Relatively speaking, the small size and novel appearance are the unique advantages of the product, and the unfavorable factors such as low brightness, poor sound effect, and incomplete integration may also restrict the subsequent market performance of the product.

FIGS. 7 to 10 show the projector provided by the present invention.

Elements and relationship between the elements are further described as follows.

Figure 7:
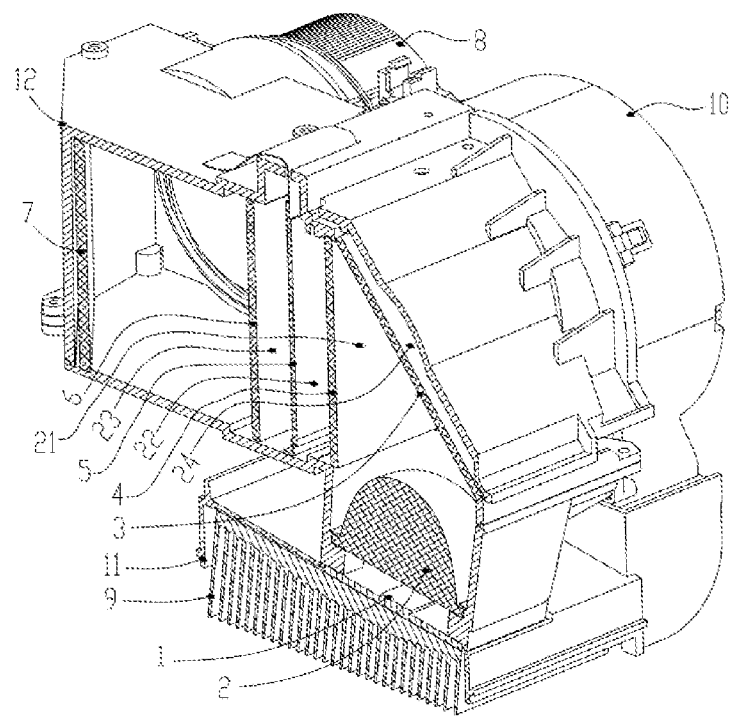
FIG. 7 is a sectional view of the optical system in a stacking state according to a preferred embodiment of the present invention.
Figure 8:
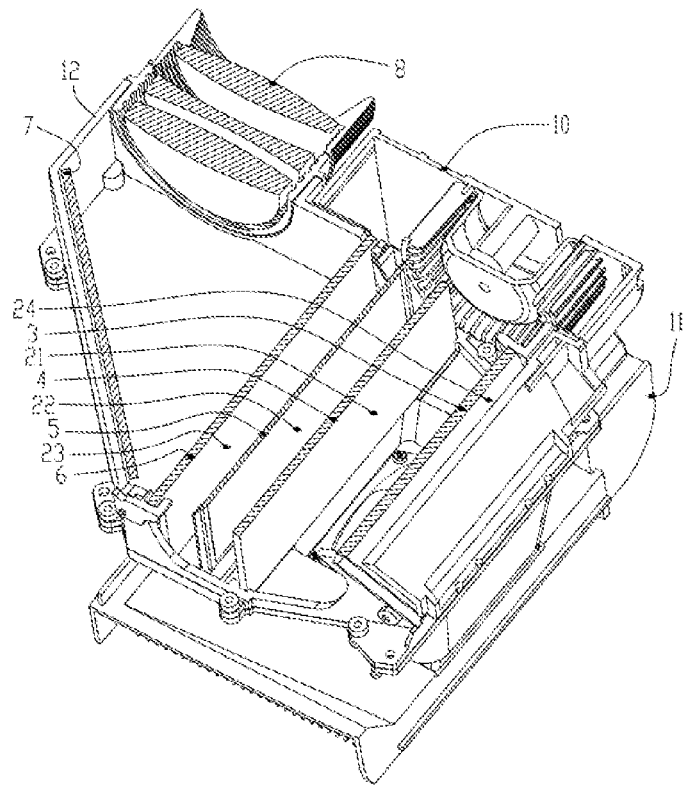
FIG. 8 is a sectional view for further explanation of FIG. 7.

A housing 12 is configured to accommodate an optical system and a fan 10. In FIGS. 7 and 8, instead of separately setting the heat reflecting glass 13, the DBEF is directly attached to the incident surface of the LCD light valve 5 for reducing the cost, and the wind resistance of a heat dissipation passage at an incident side of the LCD light valve 5, so as to finally provide a better forced cooling effect for the LCD light valve 5 and the projection light source 1.

A wind shield 11 is configured to guide the wind discharged by the fan 10, so as to provide a high-efficient forced cooling effect for the radiator 9 of the projection light source 1.

A fourth air passage 24 is provided between the illuminating reflector 3 and the housing 12.

A third air passage 23 is provided between the LCD light valve 5 and the field lens 6.

A second air passage 22 is provided between the collimating lens 4 and the LCD light valve 5.

A first air passage 21 is provided among the condenser 2, the illuminating reflector 3 and the collimating lens 4.

An inlet of the first air passage 21, the second air passage 22, the third air passage 23 and the fourth air passage 24 faces towards an exterior of the housing 12, an outlet thereof faces towards an inlet of the fan 10, so that when the fan 10 works to absorb the air, cooling air from the exterior dissipates heat from the illuminating reflector 3 and the LCD light valve 5. The optical system of the semi-vertical single LCD projector is located within a projection housing 31.

Figure 11:
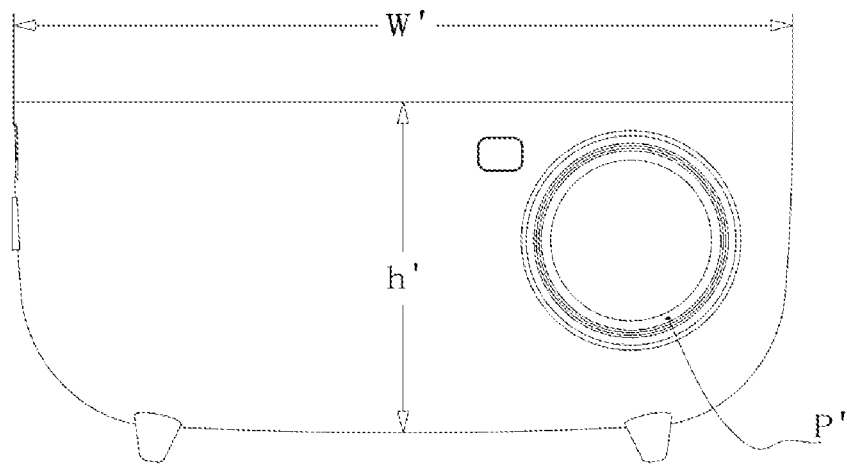
FIG. 11 shows an appearance of a horizontal projector in the prior art.

Compared with the traditional horizontal projectors shown in FIGS. 11 and 13, the present invention has an additional illuminating reflector 3 for reflection, so theoretically the same optical system, the illuminating efficiency is lower (the reflectivity of any reflective material is impossible 100%). Because the condenser 2 and the illuminating reflector 3 are combined in the design, for example, the illuminating reflector 3 is made as a simple concave cylindrical reflector (referring to a radius R in FIG. 4), the central axis of the concave cylindrical surface is parallel to the long side of the LCD light valve 5, and the direction of the optical compression characteristic of the illuminating reflector 3 is parallel to the central axis of the concave cylindrical surface. Accordingly, in the optical design, a large improvement in illumination efficiency is able to be easily obtained, because it is equivalent to adding a positive lens between the condenser 2 and the collimating lens 4 for condensing light. Therefore, when the F # of the projection lens 8 is 2.8, the light outputted by the collimating lens 4 has an illumination efficiency as high as 69-70%. In the system shown in FIG. 13, when the F # of the projection lens 8 is 2.8, since the refractive angle of the incident light and the emit light of the condenser 2 with a low refractive rate of n=1.5 is limited, the efficiency of the Fresnel collimating lens 4 with a short focal length (such as 90 mm in the table) is limited, the illuminating efficiency (the luminous flux outputted by the collimating lens 4/the luminous flux of the projection light source 1) of an excellent product, is difficult to exceed 63-63.5%, which is about 10% lower than that of the present invention. Therefore, the output brightness of the projector of the present invention is also able to reach the level of 200 Lm (ANSI) of the horizontal product shown in FIG. 13 which is excellently produced. The projector provided by the present invention has high optical efficiency and high brightness level in projection optical platforms based on the above-mentioned 3.5-inch light valve from BOE company.

Figure 10:
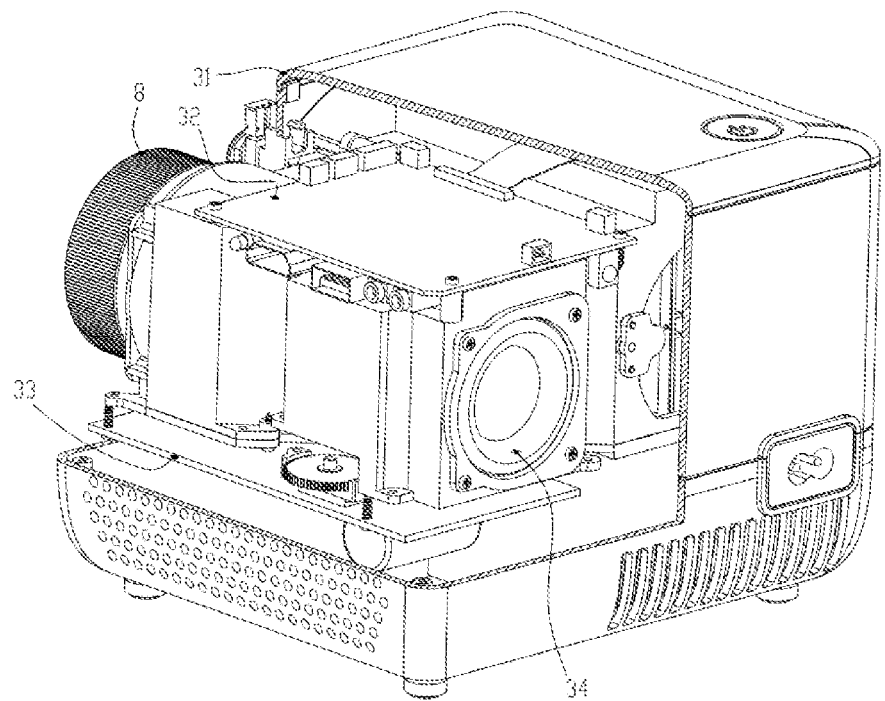
FIG. 10 is a sectional view for further explanation of FIG. 9.

FIGS. 9 and 10 show the semi-vertical projector which comprises the optical system provided by the present invention. The projector has an width (w) of 148 mm, a height (h) of 108 mm, a depth of 128 mm, and a volume of about 2 L. Compared with the prior art, it has a significant volume advantage; the total volume of the sound box is about 0.27 L (referring to the above table), which has relatively excellent sound effects, and a 100 W high-power switching power supply 33 is built in, thereby completing the integration of all components of the projector.

The semi-vertical projector manufactured by using the optical system provided by the present invention organically combines the advantages of traditional horizontal and vertical projectors, and brings a novel product stacking manner and appearance. As shown in FIG. 9, h/w is about 0.73, or w/h is about 1.37. Compared with the current horizontal products or vertical products, the appearance of the projector provided by the present invention is more novel than the unchanging horizontal products. The present invention has more coordinated appearance, more complete integration, larger sound box volume and better cost performance than the vertical products. It is very obvious in the volume advantage is very obvious. It provides a new choice for the market.

Through the demonstration of the above embodiments, the key of the present invention is to combine the illuminating mirror 3 and the imaging mirror 7 to perform a new reflecting and turning of the light, creating a new stacking manner and a novel appearance, which is essentially different from the aforementioned U.S. Pat. No. 10,509,306 B1. Referring to FIG. 7-10, a lower portion of the projection lens 8 is a regular space, and a high-power switching power supply 33 is built in the regular space for reducing cost (because the external high-power power adapter is relatively more expensive) and increasing the integration completeness; an upper portion of the illuminating reflector 3 and a rear side portion of the imaging reflector 7 are configured to accommodate the sound box with larger size for obtaining good sound effects and increasing the satisfaction of user experience. The width to height ratio of the appearance h/w realizes a new proportional structure when the volume is as small as possible. In addition, in combination with the first and second embodiments, for the glass plane reflector between the condenser 2 and the collimating lens 4, and between the LCD light valve 5 and the projection lens 8 in traditional technologies, the illuminating reflector 3 and the imaging reflector 7 made from metal are innovatively adopted. Regardless of the shape of reflective surface, the innovative illuminating reflector 3 and the innovative imaging reflector 7 significantly improve the heat dissipation of reflector itself (omitted), the optical design, the illuminating efficiency and the imaging quality. They have obvious innovative value.

The basic principles, main features and advantages of the present invention have been shown and described above. Those skilled in the art should understand that the present invention is not limited by the above-mentioned embodiments. The above-mentioned embodiments and the description only illustrate the principles of the present invention. Without departing from the spirit and scope of the present invention, the present invention will have various changes and improvements, and these changes and improvements fall within the scope of the claimed invention. The protective scope claimed by the present invention is defined by the appended claims and their equivalents.

What is claimed is:

1. An optical system of a semi-vertical single LCD (liquid crystal display) projector, the optical system comprising a projection light source (1), a condenser (2), an illuminating reflector (3), a collimating lens (4), a heat reflecting glass (13), an LCD light valve (5), a field lens (6), an imaging reflector (7) and a projection lens (8), all of which are set in sequence according to a direction of light, wherein the illuminating reflector (3) reflects and turns light irradiating the LCD light valve (5) in up and down directions, and the imaging reflector (7) performs mirror reflection and turning on light emitted by the LCD light valve (5) in left and right directions.

2. The optical system according to claim 1, wherein the illuminating reflector (3) is a plane reflector which is prepared by plating a layer of reflective film on a flat glass.

3. The optical system according to claim 1, wherein the illuminating reflector (3) is a mirror aluminum sheet, distribution parameters of a light radiation angle of the condenser (2) match optical properties of a reflective surface of the illuminating reflector (3).

4. The optical system according to claim 1, wherein the imaging reflector (7) is a plane reflector which is prepared by plating a layer of reflective film on a flat glass.

5. The optical system according to claim 1, wherein the imaging reflector (7) is a mirror aluminum sheet, parameters of the field lens (6) and the projection lens (8) match optical properties of a reflective surface of the imaging reflector (7).

6. The optical system according to claim 3, wherein the reflective surface of the illuminating reflector (3) is cylindrical, spherical, aspherical, mechanically planar or free-form cambered.

7. The optical system according to claim 5, wherein the reflective surface of the imaging reflector (7) is cylindrical, spherical, aspherical, mechanically planar or free-form cambered, a polarization of the reflective surface of the imaging reflector (7) is consistent with a polarization of the light emitted by the LCD light valve (5).

8. The optical system according to claim 3, wherein the reflective surface of the illuminating reflector (3) is a cylindrical surface in up and down directions, a central axis of the cylindrical surface in up and down directions is parallel to a long side of the LCD light valve (5), a direction of an optical compression characteristic of the illuminating reflector (3) is parallel to the central axis of the cylindrical surface in up and down directions;

or the reflective surface of the illuminating reflector (3) is a cylindrical surface in left and right directions, a central axis of the cylindrical surface in left and right directions is orthogonal to the long side of the LCD light valve (5), the direction of the optical compression characteristic of the illuminating reflector (3) is parallel to the central axis of the cylindrical surface in left and right directions.

9. The optical system according to claim 1, wherein the condenser (2) is a single lens, a combination of multiple lenses, or a combination of a reflective cup and a lens.

\* \* \* \* \*